(12) United States Patent
Alston (10) Patent No.: US 7,450,931 B2
(45) Date of Patent: Nov. 11, 2008

(54) PROVIDING REAL TIME CALL LOG DATA TO A REMOTE CALL LOG FOR CALLS TO AND FROM A MOBILE COMMUNICATIONS APPARATUS

(75) Inventor: Douglas Banes Alston, Fayetteville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 11/591,066

(22) Filed: Nov. 1, 2006

(65) Prior Publication Data

US 2007/0050501 A1    Mar. 1, 2007

Related U.S. Application Data

(63) Continuation of application No. 11/069,212, filed on Mar. 1, 2005, now Pat. No. 7,139,553.

(51) Int. Cl.
*H04L 12/58* (2006.01)
(52) U.S. Cl. .............. 455/412.1; 455/414.2; 455/432.3; 455/461
(58) Field of Classification Search ........................ None
See application file for complete search history.

(56) References Cited

U.S. PATENT DOCUMENTS

| | | | |
|---|---|---|---|
| 7,139,553 B2 * | 11/2006 | Alston | 455/412.1 |
| 2003/0153364 A1 * | 8/2003 | Osann, Jr. | 455/567 |
| 2005/0047571 A1 * | 3/2005 | Crandell et al. | 379/201.03 |
| 2005/0070250 A1 * | 3/2005 | Scalisi et al. | 455/411 |
| 2005/0107066 A1 * | 5/2005 | Erskine et al. | 455/405 |

* cited by examiner

*Primary Examiner*—Duc Nguyen
*Assistant Examiner*—Dai A Phuong
(74) *Attorney, Agent, or Firm*—Amin, Turocy & Calvin, LLP (57) ABSTRACT

Methods, systems, appaatuses, and computer program products provide call data associated with calls to and from a mobile communication appartus. The call data supports a web-accessible call log feature that presents a summary of calling activity to a subscriber of communication services. The metod involves completing a call to or from the mobile communication apparatus, storing call data associated with the completed call in a memory of the mobile communications apparatus, and substantially in real time, sending the call data to a management server associated ith the web-accessible call log feature.

19 Claims, 5 Drawing Sheets

PROVIDING REAL TIME CALL LOG DATA TO A REMOTE CALL LOG FOR CALLS TO AND FROM A MOBILE COMMUNICATIONS APPARATUS

CROSS-REFERENCE TO RELATED APPLICATIONS

This patent application is a continuation of U.S. patent application Ser. No. 11/069,212, entitled "Providing Real Time Call Log Data to a Remote Call Log for Calls to and From a Mobile Communications Apparatus," filed Mar. 1, 2005, now U.S. Pat. No. 7,139,553 and assigned to the same assignee as this application. The aforementioned patent application is expressly incorporated herein, in its entirety, by reference.

TECHNICAL FIELD

The present invention generally relates to providing call data associated with calls to and from a mobile communications apparatus and, more particularly, relates to methods for sending, substantially in real time, call records of calls to and from a mobile communications apparatus to a remote call log that is accessible over the web.

BACKGROUND

Market research indicates that call logs are a key feature of a telecommunications service concept, such as an integrated wireless and wireline service. Previous telecommunication service architecture solutions cannot provide call records for a remote call log in real time for calls to and from a mobile handset, for example a dual mode handset that is registered on a Global System for Mobile Communications (GSM) network. Having call records from some calls is less desirable with a call log feature than having record of all calls.

Previous telecommunications service architectures typically provide call detail records based on one of two techniques, network or device based techniques. In the network-based approach, call records are provided by data collected within the network infrastructure and may or may not be provided in near real time. Network based approaches require systems development and systems integration into the network infrastructure in order to present the call record information via a web-based interface. This approach can be relatively expensive and time consuming for a service application that may not reach mass-market penetration levels.

With the device-based approach, call record data is simply stored on the mobile communication apparatus or terminal for incoming and outgoing calls. This is done commonly today but this approach is limited in two respects. First, call records are not accessible from a web-based interface and are only available from the mobile terminal. Second, this approach does not allow a subscriber to capture the logs from multiple telephone numbers in a single place. Only the calls associated with the mobile terminal are accessible from that terminal. Third, the call log user interface is not feature rich as it does not include additional information such as the disposition of the call, calling party's name when the name is not included in the terminal address book, or messages left.

Accordingly there is an unaddressed need in the industry to address the aforementioned deficiencies and inadequacies.

SUMMARY

Embodiments of the present invention provide methods, computer program products, apparatuses, and systems for providing call records substantially in real time for a remote call log including call data associated with mobile calls. Approaches to providing near real time call records include methods based on short message service (SMS) text messaging and/or wireless packet data services. Call detail records are used to support a call log feature of a communications service. The call log feature provides subscribers with a web-based interface that presents subscribers with a summary of their calling activity in near real time. Embodiments of the present invention can be implemented with little or no additional cost to the communications network or the terminal device manufacturers.

One embodiment is a method for providing call data associated with calls to and from a mobile communications apparatus. The call data supports a web-accessible call log feature that presents a summary of calling activity to a subscriber of communication services. The method involves completing a call to or from the mobile communications apparatus, storing call data associated with the completed call in a memory of the mobile communications apparatus, and substantially in real time sending the call data to a management server associated with the web-accessible call log feature.

Another embodiment is a computer program product including a computer-readable medium having control logic stored therein for causing a computer to provide call log data for a remote call log associated with calls to and from a communications apparatus operating in cellular mode. The control logic includes computer-readable program code for causing the computer to complete a call to or from the communication apparatus operating in cellular mode, store call log data associated with the completed call in a memory of the communication apparatus, and send the call log data substantially in real time to a server associated with the remote call log.

Still another embodiment is a cellular communication apparatus for providing call records to a remote server supporting a web-accessible call log feature that presents a summary of calls to and from the cellular communication apparatus to a subscriber of communication services. The cellular communication apparatus includes a memory and a processor operative to complete a call to or from the cellular communication apparatus, store a call record associated with the completed call in the memory of the communication apparatus, and send substantially in real time the call record to the server supporting the web-accessible call log feature.

Other systems, methods, apparatuses, features, and advantages of the present invention will be or become apparent to one with skill in the art upon examination of the following drawings and detailed description. It is intended that all such additional systems, methods, features, apparatuses, and advantages be included within this description, be within the scope of the present invention, and be protected by the accompanying claims.

DETAILED DESCRIPTION

As described briefly above, embodiments of the present invention provide methods, systems, and computer program products for providing call data substantially in real time to a remote call log. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
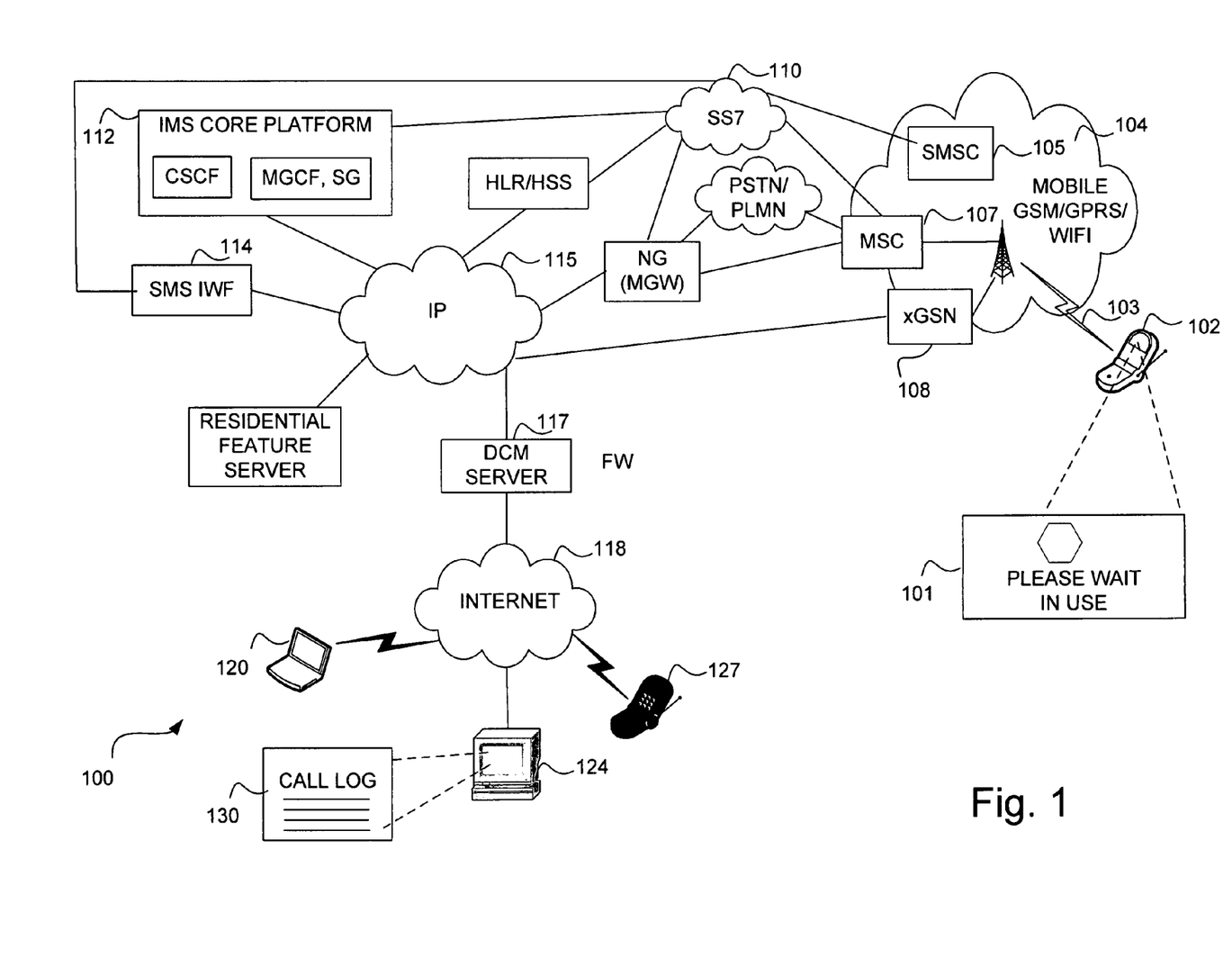
FIG. 1 is a functional network diagram illustrating aspects of a communications network utilized in an illustrative embodiment of the invention.
Figure 2:
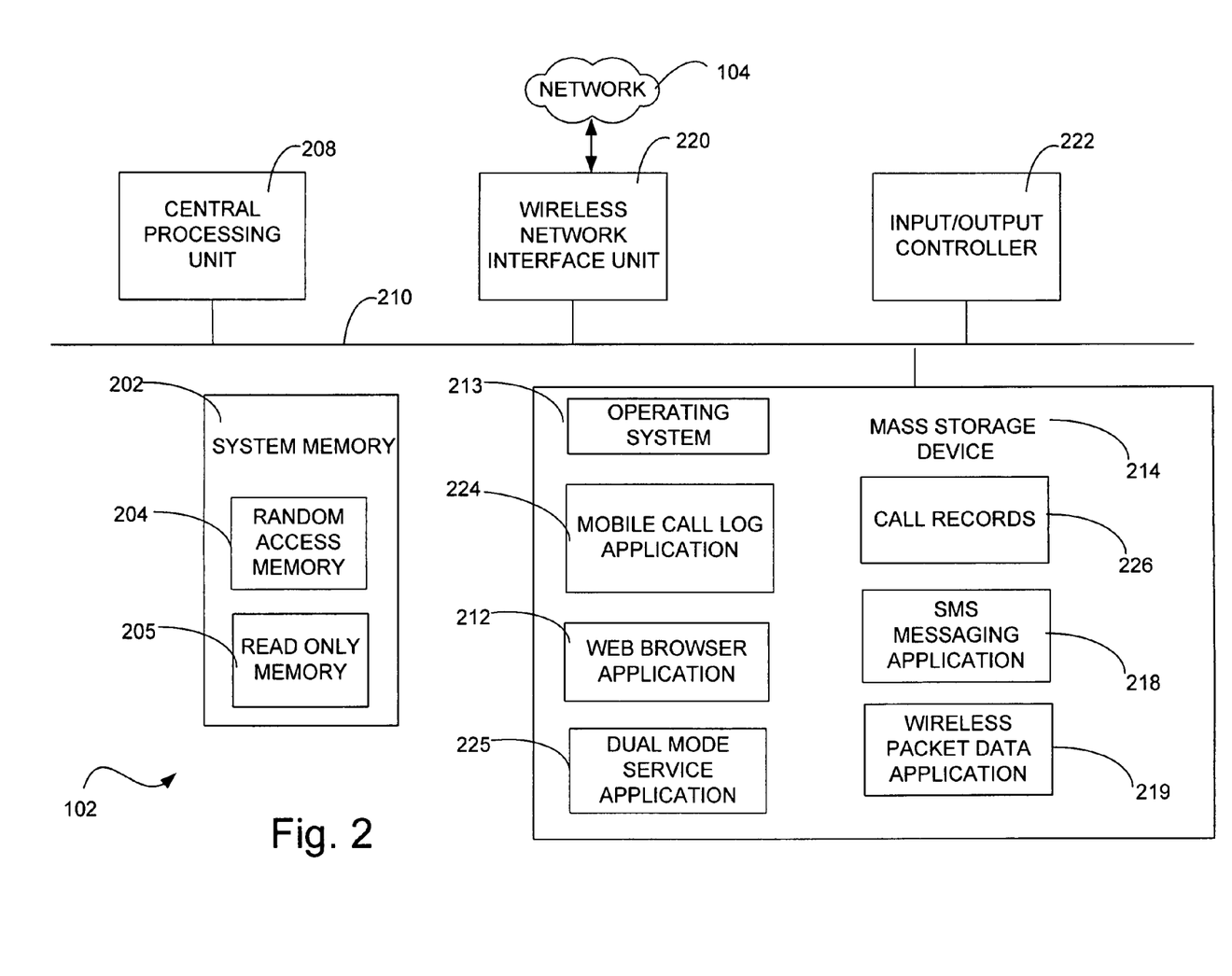
FIG. 2 illustrates computing system architecture for a mobile communications apparatus utilized in an illustrative embodiment of the invention.

Referring now to the drawings, in which like numerals represent like elements through the several figures, aspects of the present invention and the illustrative operating environment will be described. FIGS. 1-2 and the following discussion are intended to provide a brief, general description of a suitable computing environment in which the embodiments of the invention may be implemented. While the invention will be described in the general context of program modules that execute on a communications apparatus, those skilled in the art will recognize that the invention may also be implemented in combination with other program modules.

Generally, program modules include routines, operations, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

It is advantageous to describe an illustrative operating environment in which the present invention may operate. FIG. 1 is a functional network diagram illustrating aspects of a communications network that provide an illustrative operating environment 100 for embodiments of the invention. The operating environment 100 illustrates an IP Multimedia Subsystem—(IMS) based converged wireless and wireline services network architecture. Components of the wireline and wireless services network architecture include a communication apparatus 102, such as a dual mode handset having the capability to operate over a network 104, such as a cellular network or a wireless fidelity (WiFi) network, a packet data switch 108, such as GGSN and/or SGSN, a mobile switching center 107, short message service center (SMSC) 105, an SMS interworking (IWF) element 114, and a management server 117, such as a desktop communication management (DCM) server. The SMS IWF 114 is defined in the Third Generation Partnership Project (3GPP) protocol standards that are incorporated herein by reference, 3GPP TS 23.234 V6.2.0, 2004.

The communication apparatus 102 may support voice and data communications over two different radio network air interfaces. The communication apparatus 102 operates as a mobile phone using a traditional mobile radio interface such as GSM/General Packet Radio Service (GPRS), Code-Division Multiple Access (CDMA) 2000, or wideband CDMA (WCDMA). The communication apparatus may also operate over a wireless LAN radio link such as 802.11a/b/g or Bluetooth. Call records containing call data associated with calls originating from the communication apparatus 102 operating in cellular mode are sent to the management server 117 via the network components utilizing SMS messaging and or wireless data packets.

The data packet switches 108, such as GGSN and the SGSN, are core network elements defined by the 3GPP standards community to support wireless packet data services over mobile GSM, GPRS, and Enhanced Data GSM Environment (EDGE) networks. The SMSC 105 supports SMS messaging in mobile networks via an SS7 network 110 and the SMS IWF 114 provides protocol and address mapping and other functions that support messaging between endpoints located in an IP service domain 115 and a mobile SMS/MAP service domain. During a transfer of call data from the communication apparatus 102 to the SMSC 105, a display 101 of the communication apparatus 102 may display an icon indicating that the communication apparatus is in use.

Further, the management server 117 provides an Internet web-based interface through which subscribers control and use the features and functions associated with their integrated dual mode wireless wireline converged service. A cellular phone 127, personal computer 124, and /or laptop computer 120, equipped with a web browser, may access a call log 130 via the Internet 118.

The modern public switched telephone network 109 (PSTN) has separate signaling paths for voice signals (or other customer-utilized communication circuits) and for control signals, which include information transmitted throughout the network to control the connection and disconnection of the voice circuits_and may have other communication channels. Voice signals are typically carried through trunk connections, while control signals are carried across a SS7 network 110.

The PSTN also incorporates an AIN. The AIN also uses the SS7 network 110 for signal or system control message transport. The components thereof are well known in the art. However, it should be appreciated that other protocols, such as Session Initiation Protocol (SIP), an IP-based protocol may be used for signal or system control message transport. Additional details with respect to providing call log data will be described below with respect to FIGS. 4 and 5.

FIG. 2 illustrates a computing apparatus architecture for the communication apparatus 102 of FIG. 1 utilized in an illustrative embodiment of the invention. The communication apparatus 102 may be a cellular phone or a dual mode wireless and WiFi wireline mobile phone. The communication apparatus 102 includes a central processing unit (CPU) 208, a system memory 202, and a system bus 210 that couples the system memory 202 to the CPU 208. The system memory 202 includes read-only memory (ROM) 205 and random access memory (RAM) 204. A basic input/output system (BIOS) (not shown), containing the basic routines that help to transfer information between elements within the communication apparatus 102, such as during start-up, is stored in ROM 205.

The communication apparatus 102 further includes a mass storage device (MSD) 214 for storing an operating system 213 such as LINUX, a mobile call log application 224 for providing call log data to the management server 117, an SMS messaging application 218 for sending the call log data, in the alternative a wireless data packet application 219 for sending the call log data to the management server 117, and call records 226 that may be temporarily stored in supporting the call log feature of the communications service. The MSD 214 may also include a dual mode service application 225 supporting cellular and WiFi communication and a web browser application 212 for viewing the call log 130 via the Internet 118.

The mobile call log application 224 provides call records for transmission to the management server 117. The SMS messaging application 218 or the wireless data packet application 219 is operative to send the call records 226 to the management server 117 in near real time upon completing a call that is answered, unanswered, busy, or failed. Additional details regarding providing call log data to the management server 117 will be described below with respect to FIGS. 4 and 5.

The MSD 214 is connected to the CPU 208 through a mass storage controller (not shown) connected to the system bus 210. The MSD 214 and its associated computer-readable media, provide non-volatile storage for the communication apparatus 102. Although the description of computer-readable media contained herein refers to a mass storage device, such as a hard disk, it should be appreciated by those skilled in the art that computer-readable media can be any available media that can be accessed by the CPU 208.

An input/output controller 222 may also be included with the communication apparatus 102 for receiving and processing input from a number of input devices (not shown). The input/output controller 222 communicates with the CPU 208 through the system bus 210.

The CPU 208 may employ various operations, discussed in more detail below with reference to FIGS. 4 and 5 to provide and utilize the signals propagated between the communication apparatus 102 and the communications network 100. The CPU 208 may store data to and access data from mass storage device 214, such as electronic memory or magnetic storage. Data is transferred to and received from the storage device 214 through the system bus 210. The CPU 208 may be a general-purpose computer processor. Furthermore as mentioned below, the CPU 208, in addition to being a general-purpose programmable processor, may be firmware, hard-wired logic, analog circuitry, other special purpose circuitry, or any combination thereof.

According to various embodiments of the invention, the communication apparatus 102 operates in a networked environment, as shown in FIG. 1, using logical connections to remote computing devices via wireless network communication. The communication apparatus 102 may connect to the network 104 via a wireless network interface unit 220. It should be appreciated that the wireless network interface unit 220 may also be utilized to connect to other types of networks and remote computer systems.

A computing apparatus, such as the communication apparatus 102, typically includes at least some form of computer-readable media. Computer readable media can be any available media that can be accessed by the communication apparatus 102. By way of example, and not limitation, computer-readable media may include computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the communication apparatus 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
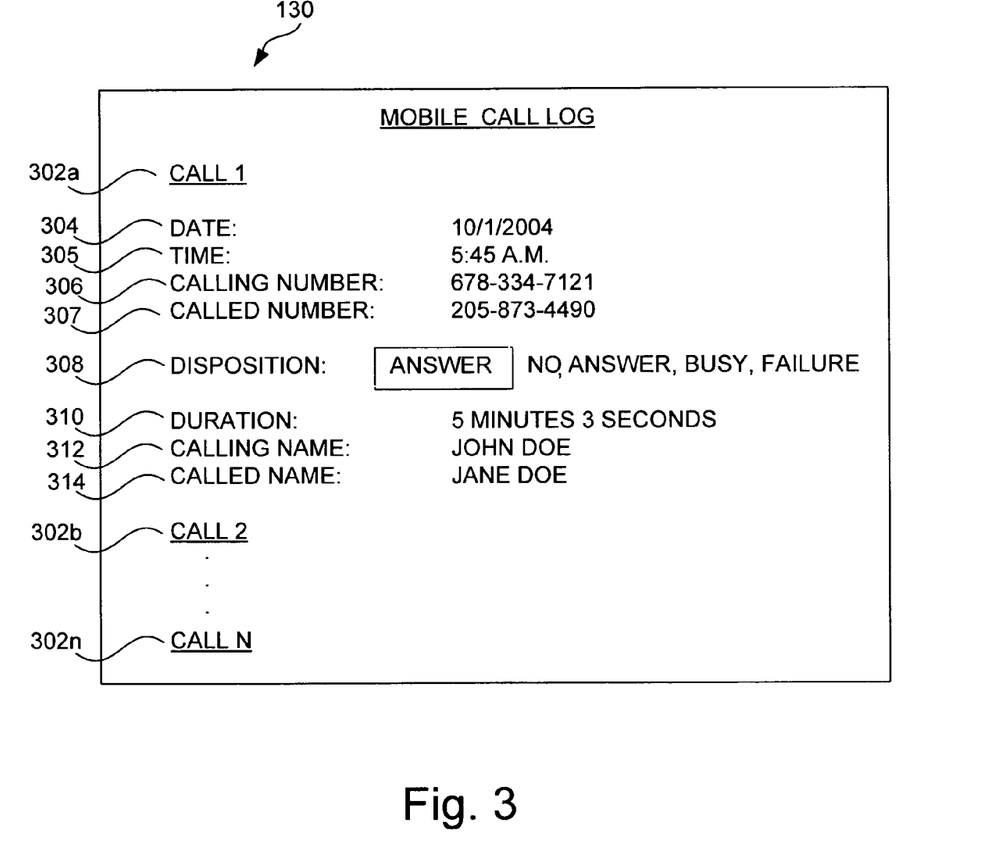
FIG. 3 illustrates a call log containing call records that include call data associated with a subscriber and utilized in an illustrative embodiment of the invention.

FIG. 3 illustrates the call log 130 of FIG. 1 containing call records that include call data associated with a subscriber and utilized in an illustrative embodiment of the invention. The call log 130, displayed via the personal computer 124, may include call records 302a-302n. Each call record 302 may include call data fields showing a date of the call 304, a time of the call 305, a calling phone number 306, a called phoned number 307, a disposition of the call 308, a duration of the call 310, a calling name 312, and a called name 314 as well as other call record parameters.

Figure 4:
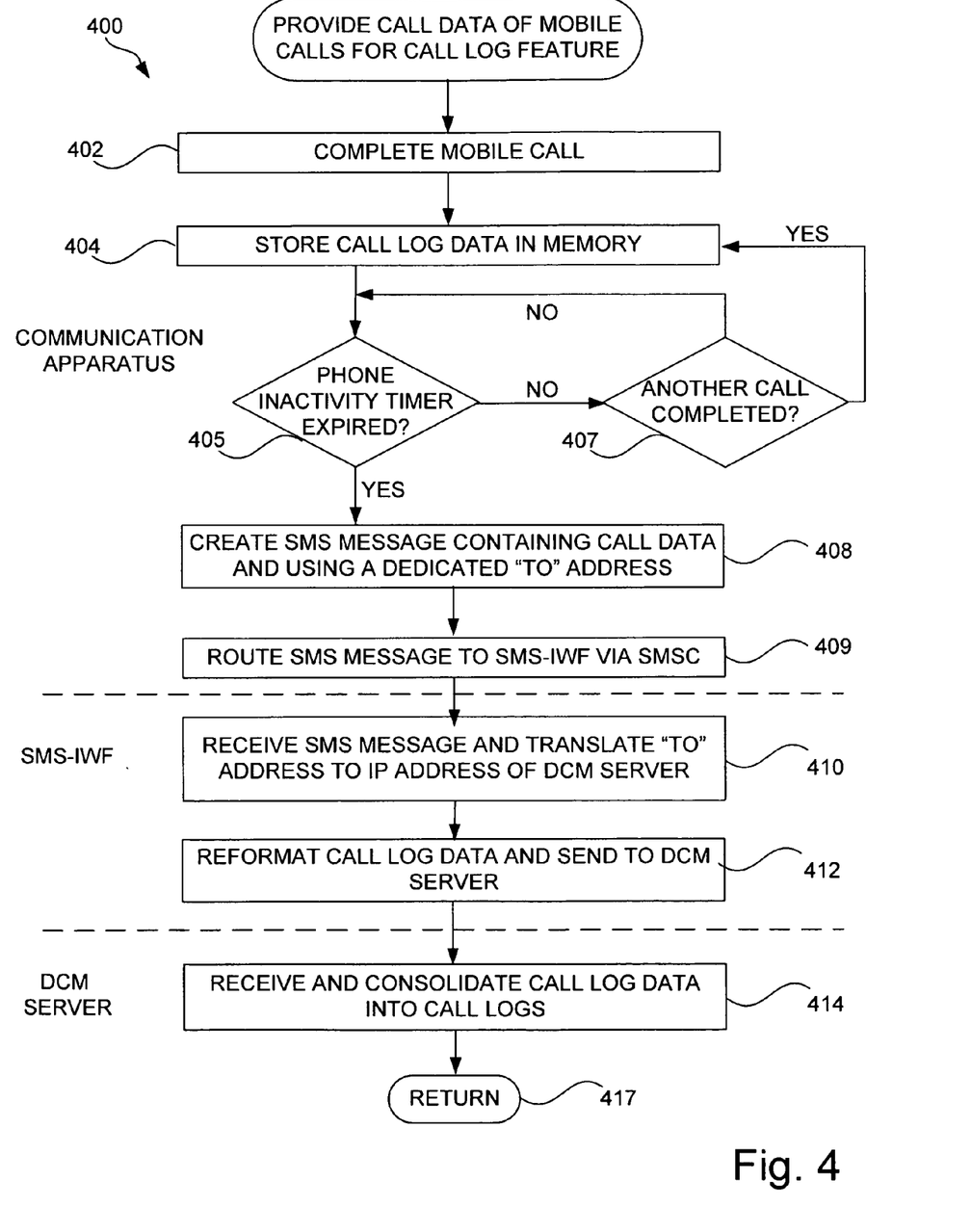
FIG. 4 illustrates an operational flow performed in providing call data substantially in real time to a remote call log according to an illustrative embodiment of the invention.

Turning now to FIGS. 1, 2, and 4 an operational flow 400 performed in providing call data substantially in real time to a remote call log according to an illustrative embodiment of the invention will be described. The operational flow 400 begins at operation 402 where the communication apparatus 102 operating in cellular mode, such as GSM mode, completes a call to or from the communication apparatus. It should be appreciated that call completion is satisfied when an outgoing call is answered, receives ring back signaling but remains unanswered, or results in a busy signal, and when an incoming call reaches the alerting state.

The operational flow 400 then continues to operation 404 where the communication apparatus 102 stores the call record temporarily in the MSD 214. Next, at detect operation 405, the communication apparatus 102 detects whether an inactivity timer within the mobile call log application 224 has expired. The inactivity timer is set a predetermined time to assure that the communications apparatus 102 is not in use before proceeding with the transmission of call records to the management server 117. Thus, the communication apparatus 102 waits a period of time to insure that the caller is finished using the communication apparatus. If the communication apparatus 102 detects that the inactivity timer has not expired, the routine 400 continues to detect operation 407.

At detect operation 407, a determination is made as to whether another call has been completed. If subsequent calls are completed before the inactivity timer expires, the operational flow 400 continues from detect operation 407 to operation 404 described above where the communication apparatus 102 temporarily stores a call record of the subsequent call to the MSD 214. If another call has not been completed the operational flow 400 returns from the detect operation 407 to detect operation 405 described above.

If at detect operation 405, the inactivity timer does expire, for example after a period of inactivity (i.e. 30 seconds), the routine 400 continues to operation 408 where the communication apparatus 102 creates an SMS message (or messages if the stored call records exceed the size limit defined for SMS) containing call data. The SMS message(s) created may use a dedicated telephone number as a "TO" address for sending the SMS message.

Next, at operation 409, the communications apparatus 102 sends SMS message(s) containing the call record(s) to the address of the SMS IWF 114 via the SMSC 105. During the brief period the communication apparatus 102 is sending the SMS message, an icon on the display 101 indicates an in use operation. The operational flow 400 then continues to operation 410.

At operation 410, the SMS IWF 114 receives the SMS message and translates the "TO" address to the IP address of the management server 117. Then, at operation 412, the SMS IWF 114 reformats the call data of the call record and sends the call record(s) to the management server 117. The messages are routed to the management server 117 using any one of several standards defined by the Internet Engineering Task Force (IETF) for messaging (e.g. SIP, SMTP, etc.)

The operational flow 400 then continues to operation 414 where the management server 117 receives the reformatted call data and consolidates the call data into call logs associated with the subscriber of the communication services. The management server 117 may combine these records with other call logs associated with the subscriber based on the calling number and present the consolidated list of call logs to the user via the Internet 118 web interface. The operational flow 400, then returns control to other operations at return operation 417.

Figure 5:
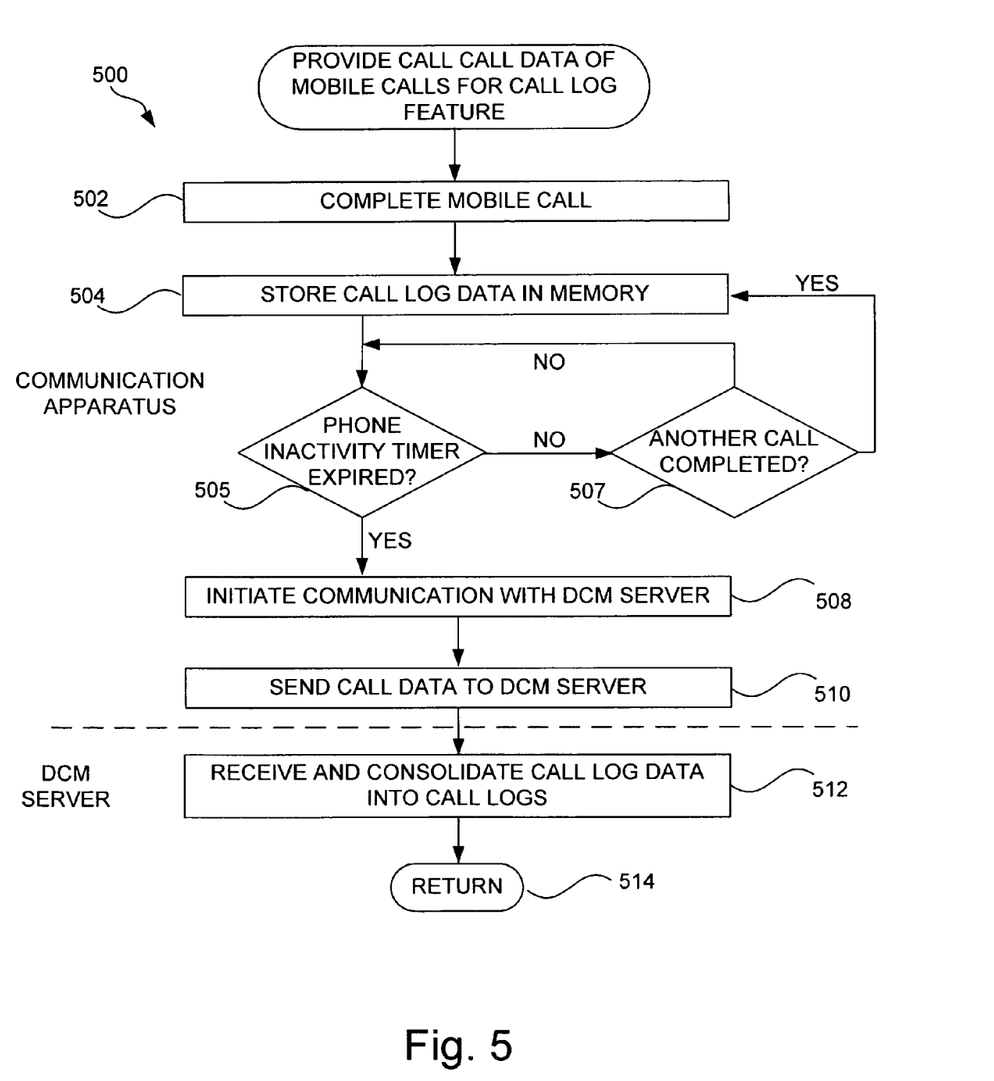
FIG. 5 illustrates an operational flow performed in providing call data substantially in real time to a remote call log according to another illustrative embodiment of the invention.

Turning now to FIGS. 1, 2, and 5 an operational flow 500 performed in providing call data substantially in real time to a remote call log according to an illustrative embodiment of the invention will be described. The operational flow 500 begins at operation 502 where the communication apparatus 102 operating in cellular mode, such as GSM mode, completes a call to or from the communication apparatus 102.

The operational flow 500 then continues to operation 504 where the communication apparatus 102 stores the call record temporarily in the memory 214. Next, at detect operation 505, the communication apparatus 102 detects whether an inactivity timer within the mobile call log application 224 has expired. The inactivity timer is set a predetermined time to assure that the communications apparatus 102 is not in use before proceeding with the transmission of call records to the management server 117. Thus, the communication apparatus 102 waits a period of time to insure that the caller is finished using the communication apparatus. If the communication apparatus 102 detects that the inactivity timer has not expired, the routine 500 continues to detect operation 507.

At detect operation 507, a determination is made as to whether another call has been completed. If subsequent calls are completed before the inactivity timer expires, the operational flow 500 continues from detect operation 507 to operation 504 described above where the communication apparatus 102 temporarily stores a call record of the subsequent call to the MSD 214. If another call has not been completed the operational flow 500 returns from the detect operation 507 to detect operation 505 described above.

If at detect operation 505, the inactivity timer does expire, for example after a period of inactivity (i.e. 30 seconds), the routine 500 continues to operation 508 where the communication apparatus 102 initiates a wireless packet data session and establishes a connection to the management server 117. The communication apparatus 102 establishes communication via the wireless data packet switch 108.

At operation 510 once communication is established, the communication apparatus 102 sends the call records stored in memory to the management server 117 using any one of several standard data protocols (e.g. WAP, HTTP, UDP, SMTP, etc.). When the data transfer is complete, the communication apparatus 102 ends the wireless packet data session. During the brief period of the wireless packet data session, an icon on the communication apparatus display 101 indicates an in use status.

The operational flow 500 then continues to operation 512 where the management server 117 receives the call data and consolidates the call data into call logs associated with the subscriber of the communication services. The management server 117 may combine these records with other call logs associated with the subscriber based on the calling number and present the consolidated list of call logs to the user via the Internet 118 web interface. The operational flow 500, then returns control to other operations at return operation 514.

Thus, the present invention is presently embodied as methods, systems, computer program products or computer readable mediums encoding computer programs for providing call data associated with calls to or from a mobile communications apparatus.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for providing call data associated with calls to and from a mobile communications apparatus, the method comprising:

completing a call one of to and from the mobile communications apparatus;

substantially in real time sending call data to a management server associated with a web-accessible call log feature;

storing the call data associated with the completed call in a memory of the mobile communications apparatus;

detecting whether the mobile communications apparatus has been inactive for a specified duration of time;

in response to detecting that the mobile communications apparatus has not been inactive for the specified duration of time, detecting whether another call one of to and from the mobile communications apparatus has been completed; and in response to detecting another call has been completed, storing call data associated with the another call in the memory;

wherein sending the call data to the management server comprises sending to the management server call data stored in the memory that is associated with completed calls at least one of to and from the mobile communications apparatus in response to detecting that the mobile communications apparatus has been inactive for the specified duration of time;

wherein the call data supports the web-accessible call log feature that presents a summary of calling activity to a subscriber of communication services.

2. The method of claim 1, wherein storing the call data comprises storing the call data temporarily in the memory of the mobile communications apparatus.

3. The method of claim 1, wherein sending the call data comprises sending a call record of the completed call to the management server.

4. The method of claim 1, wherein sending the call data to the management server comprises:
creating an SMS message that contains the call data and is addressed to a destination address;
routing the SMS message containing the call data to an SMS interworking function module wherein the SMS interworking function module is operative to:
receive the SMS message;
translate the destination address to an IP address of the management server;
reformat the call data; and
send the reformatted call data to the management server wherein the management server is operative to:
receive the reformatted call data;
consolidate the reformatted call data with call logs associated with the subscriber; and
present the consolidated call logs via a web-accessible interface.

5. The method of claim 4, wherein creating the SMS message that contains the call data and is addressed to the destination address comprises creating an SMS message that is addressed to a telephone number dedicated to supporting the web-accessible call log feature.

6. The method of claim 1, wherein storing the call data associated with the completed call comprises storing at least one of the following:
a date of the call;
a time of the call;
a calling number from which the call was originated;
a called number;
a disposition of the call wherein the disposition comprises one of an answer, no answer, a failure, and busy;
a duration of the call;
a calling party name; and
a called party name.

7. The method of claim 1, wherein sending the call data substantially in real time comprises sending the call data to the management server wherein the management server is operative to consolidate the call data with call logs associated with the subscriber and present the consolidated call logs via a web-accessible interface.

8. The method of claim 1, further comprising displaying an icon via an interface of the mobile communications apparatus while sending the call data thereby indicating that the mobile communications apparatus is in use.

9. The method of claim 1, wherein completing the call from the mobile communications apparatus comprises completing a call from a dual mode handset operating in cellular mode and wherein the communication services include an integrated wireline and wireless communications service.

10. The method of claim 1, wherein sending the call data to the management server substantially in real time comprises:
initiating a wireless packet data session;
establishing communication with the management server; and
sending the call data to the management server.

11. A computer program product comprising a computer-readable medium having control logic stored therein for causing a computer to provide call log data for a remote call log associated with calls at least one of to and from a communications apparatus operating in cellular mode, the control logic comprising computer-readable program code for causing the computer to:
complete a call one of to and from the communication apparatus operating in cellular mode;
send call log data substantially in real time to a server associated with the remote call log;
store the call log data associated with the completed call in a memory of the communication apparatus;
detect whether the communication apparatus has been inactive for a specified duration of time;
in response to detecting that the communication apparatus has not been inactive for the specified duration of time, detect whether another call from the communication apparatus has been completed;
in response to detecting another call has been completed, store call log data associated with the another call in the memory; and
wherein the computer-readable program code for causing the computer to send the call log data to the server is operative to send to the server call log data stored in the memory that is associated with completed calls at least one of to and from the communication apparatus in response to detecting that the communication apparatus has been inactive for the specified duration of time.

12. The computer program product of claim 11, wherein the computer-readable program code for causing the computer to store the call data is operative to cause the computer to store the call data temporarily in the memory of the communication apparatus.

13. The computer program product of claim 11, wherein the computer-readable program code for causing the computer to cause the computer to send the call log data is operative to send a call record of the completed call to the server.

14. The computer program product of claim 11, wherein the computer-readable program code for causing the computer to send the call log data to the server is further operative to:
create an SMS message that contains the call log data and is addressed to a destination address;
route the SMS message containing the call log data to an SMS interworking function module wherein the SMS interworking function module is operative to:
receive the SMS message;
translate the destination address to an IP address of the server;
reformat the call log data; and
send the reformatted call log data to the server wherein the server is operative to:
receive the reformatted call log data;
consolidate the reformatted call log data with other call logs associated with a subscriber; and
present the call logs consolidated via a web-accessible interface.

15. The computer program product of claim 11, wherein the computer-readable program code for causing the computer to send the call log data to the server substantially in real time us operative to cause the computer to:
initiate a wireless packet data session;
establish communication with the server; and
send the call log data to the server.

16. The computer program product of claim 11, further comprising computer-readable program code for causing the computer to display an icon via an interface of the communication apparatus while sending the call log data thereby indicating that the communication apparatus is in use.

17. A cellular communication apparatus for providing call records to a remote server supporting a web-accessible call log feature, the cellular communication apparatus comprising:
a processor operative to:
complete a call from the cellular communication apparatus; and send substantially in real time a call record associated with the completed call to the server supporting the web-accessible call log feature;

store the call record associated with the completed call in a memory of the cellular communication apparatus;

detect whether the cellular communication apparatus has been inactive for a specified duration of time;

in response to detecting that the cellular communication apparatus has not been inactive for the specified duration of time, detect whether another call one of to and from the cellular communication apparatus has been completed;

in response to detecting another call has been completed, store a call record associated with the another call in the memory;

wherein sending the call record to the server comprises sending to the server a call record stored in the memory that is associated with completed calls at least one of to and from the cellular communication apparatus in response to detecting that the cellular communication apparatus has been inactive for the specified duration of time; and wherein the call log feature presents a summary of calls at least one of to and from the cellular communication apparatus to a subscriber of communication services.

18. The cellular communication apparatus of claim 17, wherein the processor operative to send the call record to the server is operative to:
  create an SMS message that contains the call record and that is addressed to a destination address;
  route the SMS message containing the call record to an SMS interworking function module wherein the SMS interworking function module is operative to:
  receive the SMS message;
  translate the destination address to an IP address of the server;
  reformat the call record; and
  send the reformatted call record to the server wherein the server is operative to:
    receive the reformatted call record;
    consolidate the reformatted call record with call logs associated with the subscriber; and
    present the call logs consolidated via a web-accessible interface.

19. The cellular communication apparatus of claim 17, wherein the processor operative to send the call record substantially in real time to the server is operative to:
  initiate a wireless packet data session;
  establish communication with the server; and
  send the call record to the server.

* * * * *